United States Patent
Zhong et al.

(10) Patent No.: US 10,419,717 B2
(45) Date of Patent: Sep. 17, 2019

(54) SPLIT-TYPE TELEVISION FOR CONVERTING CONTENT TO A STANDARD FORMAT

(71) Applicant: AMLOGIC (SHANGHAI) CO., LTD., Shanghai (CN)

(72) Inventors: John Zhong, Shanghai (CN); Mike Yip, Shanghai (CN); Kevin Chen, Shanghai (CN); Robin Zhu, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/321,604

(22) PCT Filed: Oct. 27, 2015

(86) PCT No.: PCT/CN2015/092884
§ 371 (c)(1),
(2) Date: Dec. 22, 2016

(87) PCT Pub. No.: WO2016/070731
PCT Pub. Date: May 12, 2016

(65) Prior Publication Data
US 2017/0264850 A1 Sep. 14, 2017

Related U.S. Application Data

(60) Provisional application No. 62/077,236, filed on Nov. 8, 2014.

(30) Foreign Application Priority Data

Mar. 25, 2015 (CN) .......................... 2015 1 0134451

(51) Int. Cl.
*H04N 7/16* (2011.01)
*H04N 7/01* (2006.01)
(Continued)

(52) U.S. Cl.
CPC ....... *H04N 7/0125* (2013.01); *G06F 13/4081* (2013.01); *H01R 24/64* (2013.01);
(Continued)

(58) Field of Classification Search
CPC ........... H04N 21/4401; H04N 21/6143; H04N 21/4622; H04N 21/4383; H04N 21/4363;
(Continued)

(56) References Cited

U.S. PATENT DOCUMENTS 8,339,514 B2 * 12/2012 Dawson .................... G06F 8/65
348/553
8,450,880 B2 * 5/2013 Narita ...................... H04N 5/63
307/116
(Continued)

FOREIGN PATENT DOCUMENTS

CN 2854960 Y 1/2007
CN 101068318 A 11/2007
(Continued)

*Primary Examiner* — Nasser M Goodarzi
*Assistant Examiner* — Patrick A Ryan
(74) *Attorney, Agent, or Firm* — Leason Ellis LLP

(57) ABSTRACT

The separating television provided in the present invention relates to the field of television and through independently configuring the master control module and the screen terminal module in the television, the screen terminal module is mainly used to play the audio and video data and control the playing, and the master control module is mainly used to receive and process the audio and video data; the master control module and the screen terminal module are independently configured in physical structure, thus allows users to carry out the operations like repair, maintenance, upgrade and replacement on them independently; especially for the extreme unmatched upgrade speed between the screen terminal device and the master control device in the field of the television, the separating television disclosed in the present (Continued)

application can upgrade each separate unit according to individual requirements, thus effectively reduces the upgrading cost of televisions.

12 Claims, 1 Drawing Sheet

(51) Int. Cl.
| | |
|---|---|
| H04N 21/41 | (2011.01) |
| H04N 21/462 | (2011.01) |
| H04N 21/2365 | (2011.01) |
| H04N 21/438 | (2011.01) |
| H04N 21/61 | (2011.01) |
| H04N 21/2385 | (2011.01) |
| H04N 21/2665 | (2011.01) |
| H04N 21/2383 | (2011.01) |
| H04N 21/4363 | (2011.01) |
| H04N 5/64 | (2006.01) |
| H04N 5/44 | (2011.01) |
| H04N 5/46 | (2006.01) |
| H04N 5/60 | (2006.01) |
| H04N 5/63 | (2006.01) |
| G06F 13/40 | (2006.01) |
| H04N 5/38 | (2006.01) |
| H01R 24/64 | (2011.01) |
| H01R 27/02 | (2006.01) |
| H04N 21/426 | (2011.01) |
| H01R 107/00 | (2006.01) |

(52) U.S. Cl.
CPC ............... *H01R 27/02* (2013.01); *H04N 5/38* (2013.01); *H04N 5/4401* (2013.01); *H04N 5/4403* (2013.01); *H04N 5/46* (2013.01); *H04N 5/60* (2013.01); *H04N 5/63* (2013.01); *H04N 5/64* (2013.01); *H04N 7/01* (2013.01); *H04N 21/2365* (2013.01); *H04N 21/2383* (2013.01); *H04N 21/2385* (2013.01); *H04N 21/2665* (2013.01); *H04N 21/41* (2013.01); *H04N 21/4104* (2013.01); *H04N 21/4122* (2013.01); *H04N 21/426* (2013.01); *H04N 21/4363* (2013.01); *H04N 21/4382* (2013.01); *H04N 21/4383* (2013.01); *H04N 21/43635* (2013.01); *H04N 21/4622* (2013.01); *H04N 21/6125* (2013.01); *H04N 21/6143* (2013.01); *H01R 2107/00* (2013.01); *H01R 2201/18* (2013.01); *H04N 2005/4412* (2013.01); *H04N 2005/4414* (2013.01)

(58) Field of Classification Search
CPC ........... H04N 21/4382; H04N 21/2385; H04N 21/2383; H04N 21/2365; H04N 21/2665
See application file for complete search history.

(56) References Cited

U.S. PATENT DOCUMENTS

| | | | | |
|---|---|---|---|---|
| 9,736,436 | B2* | 8/2017 | Beals | H04N 7/20 |
| 2007/0199042 | A1* | 8/2007 | Yip | H04H 20/04 |
| | | | | 725/135 |
| 2008/0120667 | A1* | 5/2008 | Zaltsman | H04L 12/2856 |
| | | | | 725/110 |
| 2013/0283331 | A1* | 10/2013 | Kim | H04N 21/2385 |
| | | | | 725/116 |
| 2013/0332967 | A1* | 12/2013 | Chang | H04H 40/90 |
| | | | | 725/68 |
| 2014/0157334 | A1* | 6/2014 | Cavgalar | H04N 21/4135 |
| | | | | 725/82 |

FOREIGN PATENT DOCUMENTS

| | | |
|---|---|---|
| CN | 21054664 Y | 4/2008 |
| CN | 201146566 Y | 11/2008 |
| CN | 202143162 U | 2/2012 |
| CN | 103888698 A | 6/2014 |
| CN | 203912068 U | 10/2014 |
| CN | 104767951 A | 7/2015 |

* cited by examiner

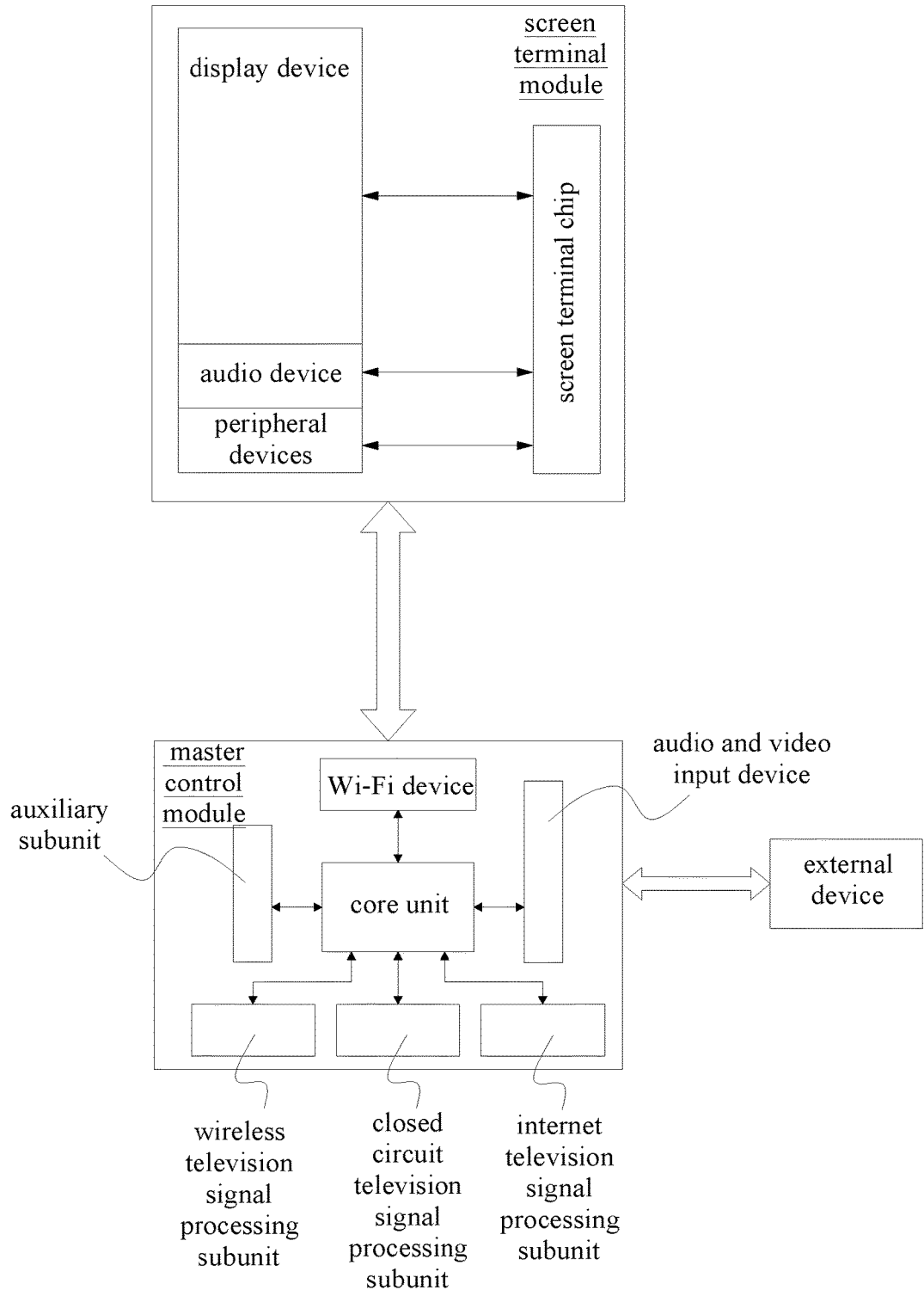

SPLIT-TYPE TELEVISION FOR CONVERTING CONTENT TO A STANDARD FORMAT

CROSS-REFERENCE TO RELATED APPLICATIONS

This application is a U.S. National Stage Application under 35 U.S.C. § 371 of International Patent Application No. PCT/CN2015/092884, filed Oct. 27, 2015 which claims priority to and the benefit of Chinese Patent Application No. CN 201510134451.9, filed on Mar. 25, 2015, and of U.S. Provisional Patent Application No. 62/007,236, filed on Nov. 8, 2014, the entire content of which is incorporated herein by reference.

BACKGROUND OF THE INVENTION

1. Field of the Invention

The invention relates to the field of television, and more particularly, to a split-type television.

2. Description of the Related Art

In the process of the development of modern society, as an important medium for people to obtain audio and video information, the television has been constantly developed with advances in technology, especially with the ever-changing internet technology; the smart television obtains more and more people's attention as the core device of smart home.

At present, televisions are all-in-one machines in the market, i.e., devices like the screen terminal for display and the main module for control are integrated as a whole for design, production and sale; the service life of the television is long (at least 4 to 5 years, or even 10 years), yet with the advances of technology, the main module is updated faster and the screen terminal device, which is updated slower, and it results the mismatch of upgrading between the components in the television as all-in-one machine, so users can only purchase the whole machine when upgrading, thereby it greatly increases the upgrading cost, and hinders the upgrading process of the core module of televisions.

In addition, with the advances in technology, functions realized and integrated in televisions are getting more and more, which shows a diversified development trend, and manufacturers integrate many functional modules in televisions to meet different users' demands as much as possible; however with the diversified developments of society, individuation of user demands is growing, thereby causes televisions produced by manufacturers impossible to meet the different demands of different users, and makes the television purchased by users attached with many useless functions to them as for itself, thereby results in a waste of resources.

SUMMARY OF THE INVENTION

In view of the above-mentioned technical issues, the present invention provides a split-type television, comprising:

a master control module, connected to a signal transmission device of the split-type television to receive first data transmitted by the signal transmission device, and convert the first data into second data after processing the first data; and a screen terminal module, connected to the master control module to receive the second data, and play audio and video signal contained in the second data;

wherein the master control module and the screen terminal module are configured separately, and the master control module can be independently upgraded and/or replaced of the screen terminal module.

As a preferable embodiment, in the split-type television, the audio and video signal comprises audio data and/or video data, and the screen terminal module comprises:

a screen terminal chip, receiving the second data and extracting the audio data and/or the video data for playing after processing the second data.

As a preferable embodiment, in the split-type television, the screen terminal module further comprises:

a display device, connected to the screen terminal chip to receive and play the video data.

As a preferable embodiment, in the split-type television, the screen terminal module further comprises:

an audio device, connected to the screen terminal chip to receive and play the audio data.

As a preferable embodiment, in the split-type television, the screen terminal module further comprises:

a peripheral device, connected to the screen terminal chip, and configured to adjust operating parameter of the audio device and the display device, and receive remote-control signal transmitted by a remote control matching with the split-type television.

As a preferable embodiment, in the split-type television, the peripheral device comprises:

a physical buttons, connected to the screen terminal chip, and configured to adjust the operating parameter of the audio device and the display device;

a remote-control signal receiving device, connected to the screen terminal chip, and configured to receive the remote-control signals transmitted by the remote control matching with the split-type television, so as to control the playing of the audio data and/or the video data.

As a preferable embodiment, in the split-type television, the master control module comprises:

at least one subunit, and each of the subunits is connected to the matching signal transmission device; and a core unit, and each of the subunits is connected to the screen terminal module through the core unit;

wherein any of the subunits receives the first data from the matching signal transmission device, and converts the first data into unprocessed data in a standard format to the core unit, and the core unit processes the unprocessed data with standard format and then converts into the second data.

As a preferable embodiment, in the split-type television, the submunits comprise:

a wireless television signal processing subunit, configured to receive and process wireless television signals transmitted through wireless broadcasting, and convert format of the wireless television signal into the standard format;

a closed circuit television signal processing subunit, configured to receive and process closed circuit television signals transmitted through wire transmission, and convert format of the closed circuit television signal into the standard format;

an internet television signal processing subunit, configured to receive and process internet television signal transmitted through Internet, and convert format of the internet television signal into the standard format.

As a preferable embodiment, in the split-type television, the master control module further comprises:

a local storage device, connected to the core unit;

wherein the core unit can call and transmit audio and video data stored in the local storage device to the screen terminal module for playing.

As a preferable embodiment, in the split-type television, the subunits further comprise:

an audio and video input device, configured to receive audio and video data transmitted by an external audio and video output device, and after processing the audio and video data, transmit the processed audio and video data to the screen terminal module.

As a preferable embodiment, in the split-type television:

the audio and video input device stores the processed audio and video data into the local storage device.

As a preferable embodiment, in the split-type television, the master control module further comprises:

an internet access device, connected to the Internet through the core unit, and configured to provide internet communication signals.

As a preferable embodiment, in the split-type television:

each of the subunits and/or the core unit is independently integrated into a single structure, for separately upgrading and/or replacing.

As a preferable embodiment, in the split-type television:

the screen terminal module exchanges data with the master control module through preset integrated bus.

As a preferable embodiment, in the split-type television, the screen terminal module further comprises:

a power adapter, supplying power to the master control module through a connecting channel.

The above technical solution has the following advantages or beneficial effects:

The technical solution of the present invention separately configures the master control module and the screen terminal module of the television, the screen terminal module is mainly used to play the audio and video data, and the master control module is mainly used to receive and process the audio and video data; the master control module and the screen terminal module are separately configured in physical structure, thus allows users to carry out the operations like repair, maintenance, upgrade and replacement on them separately; especially for the extreme unmatched upgrade speed between the screen terminal device and the master control device in the field of the television; the split-type television disclosed in the present application can upgrade each separate unit according to personalized demands, thus effectively reduces the upgrading cost of televisions.

BRIEF DESCRIPTIONS OF THE DRAWINGS

The accompanying drawings, together with the specification, illustrate exemplary embodiments of the present disclosure, and, together with the description, serve to explain the principles of the present invention.

FIG. 1 is a structure diagram of a split-type television in the embodiment of the present application.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The split-type television provided in the embodiment of the present invention integrates the core components in the television into a single independent master control module based on the prior television structure, and also the independent master control module can be made up of indispensable essential core modules in the television and at least one independently configured subunit with an independent function, and the screen terminal components used for audio and video playing are integrated into another independent screen terminal module; since the upgrade speed of the components in the screen terminal module is slower, and the upgrade speed of the components in the core module is faster; when upgrading the television, users only needs to separately upgrade the core components, which needs to be upgraded, and maintain the components don't need upgrade like in the screen terminal module and so on, so as to effectively reduce the upgrading cost of the television; also, users can match and assemble the required subunits with independent functions with the above mentioned core module according to individual needs when purchasing a new television, so as to make the television purchased meet individual needs.

The contents below describe the split-type television of the present invention in detail combined with the accompanying drawings and specific embodiments.

FIG. 1 is a structure diagram of the split-type television in the embodiment of the present application; as shown in FIG. 1, the split-type television of the embodiment comprises:

a master control module, assembled mainly by the core components of the television, for example it may comprise input devices (such as HDMI/CVBS, etc.) related to the playing contents of the television, and the master control chip, which stores relevant information like the online video data, the application data and the game data, etc; the master control module is connected to the signal transmission device of the split-type television, to receive the original data (the first data) transmitted by the signal transmission device, and convert processed original data into playing data (the second data) matched with the screen terminal module after processing the original data; i.e., the master control module is mainly used for receiving and processing television signals related to the playing contents of the television.

Preferably, the master control module can be made up of an essential core unit in the television for example assembled by the master control chip and so on and at least one subunit, and each subunit can separately realize a processing function for data with at least one format (such as wireless television data, closed circuit television data, internet signals, etc.); when the split-type television is configured with any one subunit, each of the subunits is connected to the signal transmission device matched therewith, respectively, to receive the original data in the corresponding format, and after converting the original data etc., the original data is converted into unprocessed data with a standard format, which facilitates the core unit for the later process to it, so as to convert into the playing data.

Preferably, any one of the above subunits can be separately configured together with the core unit to form the master control module which can normally operate, and realize receiving and playing a type of television signal via the screen terminal module; of course, two or more subunits can be mixed to realize receiving and playing two or more types of television signal.

Preferably, the above mentioned subunits may comprise a wireless television signal processing subunit, a closed circuit television signal processing subunit and an internet television signal processing subunit; the wireless television signal processing subunit is mainly used for receiving and processing wireless television signals transmitted through wireless broadcasting, and converts the format of the wireless television signals into the standard format, for the subsequent processes by the core unit; the wireless television signal processing subunit may comprise receiving and processing of the wireless television signals through, for example, wireless broadcasting, which correspondingly needs to be integrated with components like the receiving antenna for wireless signals and the audio and video converter etc., and can independently realize operations like receiving, analysis and converting the wireless television signal data; the closed circuit television signal processing subunit is used for receiving and processing closed circuit television signals (such as the digital television signal etc.) transmitted through wire transmission, and converts the format of the closed circuit television signals into the above mentioned standard format; the closed circuit television signal processing subunit may comprise receiving and processing of television signals via wires, which correspondingly needs to be integrated with components like the receiving device for closed circuit television signals and the audio and video converter, and can independently realize operations like receiving/transmitting, analysis and converting the closed circuit television signal data; the internet television signal processing subunit is used for receiving and processing internet television signal (such as the online audio and video data, the game data and the application data, etc) transmitted through the Internet, and converts the format of the internet television signals into the above mentioned standard format; the internet television signal processing subunit may comprises receiving and processing of the television signals via the Internet, which correspondingly needs to be integrated with components like the receiving device for internet television signals and the audio and video converter, and independently realizes operations like receiving/transmitting, analysis and converting the internet television signal data.

It should be noticed that any one of the above subunits is mainly adapted to separately receive, analysis and convert the television signal when transmitting the television signals in different ways, so as to convert the original television data into the unprocessed data in a unified standard format for the subsequent processes by the core unit; at the same time, each subunit may have components for data signal interaction according to practical needs, to achieve interacting with the television signals (such as the internet television signals) in matching format.

Preferably, the core module may also be provided with, such as, an audio and video input device for receiving audio and video data transmitted by an external audio and video output device, internet access devices (such as a Wi-Fi device providing wireless communication signals, an Ethernet device providing wire communication signals and so on) for providing internet communication signals an so on, which allows the split-type television of the embodiment be integrated into the rapidly developed Internet of Things, which is interconnected with the smart home.

Preferably, the above mentioned audio and video input device is mainly used to receive and process the audio and video data, and transmit the processed audio and video data to the display for playing; meanwhile, the audio and video input device stores the processed audio and video data into the local storage device for data backup or call; correspondingly, the local storage device should have a large storage capacity, or regularly clear data before a preset period of time through setting storage algorithm, to reserve enough storage space for storing the processed audio and video data.

Further, the core module may further comprises multiple auxiliary subunits, which can independently operate or upgrade and made up of components that can independently complete a certain function, as long as each auxiliary subunit can be separately replaced and/or upgraded.

Meanwhile, the above mentioned core unit (including master chip, etc.) can be used for processing different television signal data, and authenticating, controlling and supplying power to each subunit and so on; as a core component of television, the core unit can also be separately upgraded and replaced; i.e., the master control module is assembled with various independent unit modules and can be upgraded or replaced as a whole, and at the same time, each unit, as a single component, can be separately upgraded or replaced, thus it allows users to configure different subunits with the core unit according to their own needs to form the core module meeting individual needs when purchasing a television; and in the subsequent using, users can replace, upgrade or add relevant subunits according to their changing needs, to meet the different needs of users at different stages at any time.

It should be noticed that the above mentioned core module must comprise the core unit and at least one subunit, and as long as comprising the core unit and a subunit, the core module can realize receiving, analysis and converting the television signals having a format matching with the subunit, and also by adding any one of or more subunits and/or auxiliary subunits, so as to make the core module can correspondingly have functions matching with the added subunits.

In addition, the split-type television of the present embodiment also comprises a screen terminal module, which is in communication with the core module via peripheral cables (such as preset integrated bus, etc.) or in a wired or wireless way, to receive and play audio and video data and others transmitted by the core module, and the screen terminal module can also feedback or transmit corresponding control command to the core module, for users to do operations like playing or human-computer interaction with the split-type television; at the same time, the screen terminal module is configured independent of the core module for separate upgrading and/or replacing, and the same screen terminal module can also be connected to one or more core modules, and the same core module can also be connected to one or more screen terminal modules, and thus achieves multi-screen display or multi-screen interactive features.

Preferably, the above mentioned screen terminal module can be provided with a power adapter, while the power adapter supplies power to the screen terminal module, the power adapter can also supplies power to the master control module through the connecting channels, such as the above mentioned integrated bus, so that the screen terminal module and the master control module share the same power supply, thereby reducing the manufacturing cost and facilitating using of users.

Preferably, the above mentioned screen terminal module may include only a screen terminal chip and a display device (like liquid crystal display), and the rest related modules and devices can be configured independently or integrated into the master control module, so that the screen terminal is only used for displaying video data, and thus effectively reduces the size and weight of the screen terminal, and achieves an ultra-thin television screen.

Of course, such as, the audio device (such as a sounder) and peripheral devices (such as physical button and remote-control signal receiving device (such as infrared receiver), etc.) can be integrated or detachably configured in the screen terminal device, which is that the screen terminal chip is connected to the master control module to receive and process the audio and video data processed by the master chip, and transmit the audio data to the audio device to play and transmit the video data to the display device to play, and also make the playing progress of the display device and the audio device synchronized; the above mentioned remote-control signal receiving device is mainly used for receiving control commands transmitted by the remote control adapting with the split-type television, and transmitting the control commands to the master chip, so that the master chip controls the operation of the display device and/or the audio device according to the control commands.

Preferably, if the display device is a touch screen, the screen terminal chip can also transmit the touch control commands transmitted by the display device to the core unit of the master control module, in order to achieve the interaction between users and the television.

Preferably, users can adjust the features of the display device such as the contrast, the quality and other parameters of image display via the above mentioned physical buttons.

Preferably, the above mentioned master control module further comprises a local storage device that can be used to store the audio and video data downloaded by users and the parameter information of the playing of the television; at the same time, the screen terminal module may also comprise audio/video recording devices (such as a microphone, a camera etc.), users can record corresponding user's audio/video data through the audio/video recording device, and store it in the local storage device and/or a remote server for sharing, meanwhile the split-type television can also call and play the stored or shared user's audio/video data.

In the present embodiment, by split-type the master chip and the screen terminal module (such as a display device) of the television (i.e., configuring the master chip in the master control module), which can reduce the size of the screen terminal and upgrade the television through upgrading all or part of components of the master control module under the premise which is without replacing the display, and thus greatly reduce the upgrading cost of users.

The contents below describe the process from purchasing to upgrading/replacing the split-type television in detail:

Firstly, a user can select corresponding screen terminal module according to his/her own needs (such as size, quality, audio and video effects, etc.) when purchasing the television.

Secondly, the user select the core unit adapting with the selected screen terminal module, as well as (a) subunit(s) and auxiliary subunit(s) he/she needs based on the selected screen terminal module; and then assembles the selected core unit, subunits and auxiliary subunits into a master control module; for example, the user can select a core unit and a closed circuit television signal processing subunit if he/she only has need for a home digital television, and assemble the core unit and the closed circuit television signal processing subunit into a master control module, this allows a user to select corresponding functional subunit(s) based only on specific need(s) when purchasing, thereby reduces the cost of purchase for users.

Thereafter, by connecting the above mentioned screen terminal module to the master control module via the preset integrated bus, a television with function the user needs is formed; and after connecting the television to the matching peripheral devices, the television signal can be played once power-on.

Finally, in the process of subsequent using of the user, if there is a new requirement, the user can only purchase a functional subunit meets his/her new requirement, and assemble the purchased subunit into the master control module so as to meet his/her need on the basis of the purchased split-type television; of course, the user can also remove some subunits in the master control module of the purchased split-type television according to needs, and when replacing, upgrading or repairing, users can also separately upgrade, repair or replace a single subunit, which greatly reduces the subsequent upgrade and maintenance costs of the television.

At the same time, since each functional module in the master control module is separately integrated, the level of division of labor of manufacturers is improved, so as to reduce production costs through a separate batch mode, thus promoting the fast development of the entire industry; of course, based on the same concept, the screen terminal module can also be configured in a similar structure.

In summary, the above-described embodiments of the present invention configure the screen terminal module separately from the master control module to effectively reduce the display structure of the television, meanwhile each functional module in the master control module is independently integrated as a whole, thereby the master control module and/or any of the functional modules can be separately replaced or upgraded, so that each functional module in the whole television structure can be independently upgraded or replaced, so as to effectively solve the problem of the upgrading mismatch between the components in the television structure, and reduce the upgrade and maintenance cost of the television; and the split-type television described in the application can be specifically configured and assembled according to individual needs of different users, so as to effectively meet the individual needs of different users.

While the present disclosure has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A split-type television, comprising:
   a master control module, connected to a signal transmission device of the split-type television to receive first data transmitted by the signal transmission device, and to convert the first data into second data after processing the first data; and
   a screen terminal module comprising a screen terminal chip that is connected to the master control module and is configured to receive the second data, and to play audio and video signal contained in the second data;
   wherein the master control module and the screen terminal module are configured separately, and the master control module can be independently upgraded and/or replaced of the screen terminal module;
   wherein the master control module comprises:
      at least three subunits, each of the subunits being connected to a respective matching signal transmission device, and
      a core unit comprising a master control chip, wherein each of the subunits being connected to the screen terminal module through the core unit,
         wherein each of the subunits is configured to receive the first data from the respective matching signal transmission device, and convert the first data into unprocessed data in a standard format that is provided to the core unit, and
         wherein the core unit processes the unprocessed data in the standard format and then converts it into the processed second data, and wherein each of the subunits and the core unit is independently integrated into a single structure thereby enabling separate upgrading or replacing of each said subunits and the core unit; and
   wherein the subunits comprise:
      a wireless television signal processing subunit configured to receive and process wireless television signals transmitted through wireless broadcasting and to convert a format of the wireless television signal into the standard format;
      a closed circuit television signal processing subunit configured to receive and process closed circuit television signal transmitted through wire transmission and to convert a format of the closed circuit television signal into the standard format;
      an internet television signal processing subunit configured to receive and process internet television signal transmitted through Internet and to convert a format of the internet television signal into the standard format, and wherein the master control module and the screen terminal module are separately configured in physical structure, thereby allowing a user to carry out operations including repair, maintenance, upgrade and replacement on either of the master control module and the screen terminal module separately.

2. The split-type television according to claim 1, wherein the audio and video signal comprises audio data and/or video data, and the screen terminal module comprises:
   the screen terminal chip, receiving the second data and extracting the audio data and/or the video data for playing after processing the second data.

3. The split-type television according to claim 2, wherein the screen terminal module further comprises:
   a display device, connected to the screen terminal chip to receive and play the video data.

4. The split-type television according to claim 3, wherein the screen terminal module further comprises:
   an audio device, connected to the screen terminal chip to receive and play the audio data.

5. The split-type television according to claim 4, wherein the screen terminal module further comprises:
   a peripheral device, connected to the screen terminal chip, and configured to adjust operating parameter of the audio device and the display device, and to receive remote-control signal transmitted by a remote control matching with the split-type television.

6. The split-type television according to claim 5, wherein the peripheral device comprises:
   a physical button, connected to the screen terminal chip, and configured to adjust the operating parameter of the audio device and the display device;
   a remote-control signal receiving device, connected to the screen terminal chip, and configured to receive the remote-control signal transmitted by the remote control matching with the split-type television, so as to control playing of the audio data and/or the video data.

7. The split-type television according to claim 1, wherein the master control module further comprises:
   a local storage device, connected to the core unit;
   wherein, the core unit can call and transmit audio and video data stored in the local storage device to the screen terminal module for playing.

8. The split-type television according to claim 7, wherein the subunits further comprise:
   an audio and video input device, configured to receive audio and video data transmitted by an external audio and video output device, and after processing the audio and video data, transmit the processed audio and video data to the screen terminal module.

9. The split-type television according to claim 8, wherein the audio and video input device stores the processed audio and video data into the local storage device.

10. The split-type television according to claim 1, wherein the master control module further comprises:
    an internet access device, connected to the Internet through the core unit, and configured to provide internet communication signal.

11. The split-type television according to claim 1, wherein the screen terminal module exchanges data with the master control module through preset integrated bus.

12. The split-type television according to claim 1, wherein the screen terminal module further comprises:
    a power adapter, supplying power to the master control module through a connecting channel.

* * * * *